United States Patent [19]

Momose et al.

[11] Patent Number: 4,541,702

[45] Date of Patent: Sep. 17, 1985

[54] AUTOMATIC FOCUS ADJUSTING DEVICE

[75] Inventors: Haruhiko Momose; Toshiaki Takahashi; Yasushi Hoshino; Kohji Matsushima; Michio Yagi, all of Hachioji, Japan

[73] Assignee: Konishiroku Photo Industry Co., Ltd., Tokyo, Japan

[21] Appl. No.: 667,058

[22] Filed: Oct. 31, 1984

Related U.S. Application Data

[63] Continuation of Ser. No. 437,338, Oct. 28, 1982, abandoned.

[30] Foreign Application Priority Data

Nov. 6, 1981 [JP] Japan ................................. 56-178878

[51] Int. Cl.$^4$ ................................................ G03B 3/00
[52] U.S. Cl. ..................................... 354/400; 354/403
[58] Field of Search ............................... 354/400–409, 354/195.1, 195.11

[56] References Cited

U.S. PATENT DOCUMENTS 3,618,499 11/1971 Harvey ..................... 354/25 A X
3,999,192 12/1976 Hosoe et al. ..................... 354/25 A
4,199,235 4/1980 Matsuda et al. ................. 354/196 X
4,247,187 1/1981 Tamura ................................. 354/25

Primary Examiner—William B. Perkey
Attorney, Agent, or Firm—Jordan B. Bierman

[57] ABSTRACT

Automatic focus adjusting device comprising a range finding means which generates a signal corresponding to a distance to an object to be photographed; means for setting a photographing lens to a position corresponding to the output signal from the range finding means; a primary judging means which judges whether or not a diaphragm setting is within the range in which fixed focus photographing is possible or not; and a secondary judging means which judges whether an output signal from the range finding means is at a level capable of operating an automatic focusing means, wherein the secondary judging means judges only when the primary judging means judges that a diaphragm setting is not within the range in which fixed focus photography is possible and the automatic focusing means is operated only when the secondary judging means judges the output signal is at a level capable of operating the automatic focusing means.

13 Claims, 5 Drawing Figures

FIG. 5

|    | DF | HF | PF | STB | X     |
|----|----|----|----|-----|-------|
| 1  | 0  | 1  | 1  | 1   | V$_{HF}$  |
| 2  | 1  | 0  | 1  | 1   | V$_{HF}$  |
| 3  | 1  | 1  | 0  | 1   | V$_{PF}$  |
| 4  | 1  | 1  | 1  | 0   | V$_X$     |
| 5  | 0  | 0  | 1  | 1   | V$_{HF}$  |
| 6  | 1  | 0  | 0  | 1   | V$_{PF}$  |
| 7  | 1  | 1  | 0  | 0   | V$_{PF}$  |
| 8  | 1  | 0  | 1  | 0   | V$_{STB}$ |
| 9  | 0  | 1  | 0  | 1   | V$_{PF}$  |
| 10 | 0  | 1  | 1  | 0   | V$_{STB}$ |
| 11 | 0  | 0  | 0  | 1   | V$_{PF}$  |
| 12 | 1  | 0  | 0  | 0   | V$_{PF}$  |
| 13 | 0  | 1  | 0  | 0   | V$_{PF}$  |
| 14 | 0  | 0  | 1  | 0   | V$_{STB}$ |
| 15 | 0  | 0  | 0  | 0   | V$_{PF}$  |
| 16 | 1  | 1  | 1  | 1   | V$_X$     |

AUTOMATIC FOCUS ADJUSTING DEVICE

This application is a continuation of application Ser. No. 437,338, filed Oct. 28, 1982, now abandoned which claims priority of Japanese application No. 178,878/81, filed Nov. 6, 1981.

BACKGROUND OF THE INVENTION

The present invention relates to an automatic focus-adjusting device, especially for use in still cameras.

An automatic focusing camera such that, when a photographer aims the camera at a subject and presses a shutter releasing button, the camera measures the distance to the subject, adjusts the lens so as to bring the subject into focus, and then exposes a photofilm has long been sought after.

A wide variety of methods for realizing such results have been proposed. In 1977, the KONIKA C35AF Camera (manufactured by Konishiroku Photo Ind. Co., Ltd., Japan) served as the springboard for a wide variety of automatic focusing cameras entering the market. However, such devices have not yet materialized. One of the reasons for not developing automatic focusing devices is that the reliability of a signal from a range finder for indicating the distance at which to focus has not been satisfactory.

This problem remains unsolved even at the present time when a number of automatic focusing cameras are being widely marketed. One method of solving this problem is to improve the reliability of range finders. However, it is impossible to obtain a range finder that measures subject and background distance without fail in every photographic situation.

For example, in the case of measuring a distance in reflected natural light from a subject (hereinafter referred to as "passive type measurement"), the reliability of a signal for measuring distance is lowered when the luminance of a subject is low. Distance is also measured by emitting light from a carmera and measuring the reflected light therefrom (hereinafter referred to as "active type measurement"). In an active type system, however, it is also impossible to avoid defects such as those that are introduced by distance itself. A signal for measuring a long distance is less reliable because the level of the signal is inversely proportional to the square of the distance being measured and the S/N ratio is lowered when the subject field is bright.

Another method of overcoming the defects is to utilize the depth of focus of a lens so as to compensate for the decrease in signal reliability.

Automatic focusing devices having been prompted by conventional means include those in which: a lens is set at the fixed focal point thereof when the depth of field of a diaphragm covers the closest distance to infinity; a lens is set at the hyper-focal point and an automatic focusing device is operated when a focusing distance is not farther than half of the hyper-focal distance of the lens, but the lens is set at the hyper-focal point when the focusing distance is otherwise; and a lens is set at the fixed focal point thereof when a signal given from a range finder device cannot serve as a signal for operating an automatic focusing device.

These proposals have peculiar effects by themselves and are used to improve the reliability of an automatic focusing device. However, there are problems of putting them to practical use because they each have respective defects.

SUMMARY OF THE INVENTION

It is an object of the invention to overcome the defects in the conventional types of automatic focusing devices as mentioned above. Another object of the invention is to provide a fool-proof and highly reliable automatic focusing device in which, based on the latter of the above-mentioned methods, in order to solve the problems caused by the insufficient reliability of a signal for measuring distance, the above-mentioned defective and fragmentary proposals are corrected and organically combined together.

BRIEF DESCRIPTION OF THE DRAWINGS

FIG. 5 is a table displaying the relation between output signal codes and operational modes of an automatic focus adjusting means.

DETAILED DESCRIPTION OF THE PREFERRED EMBODIMENT

The invention may be applied to any one of the automatic focus-adjusting devices operable in accordance with a passive or active type measurement system. In the example given herein, an active type measurement was used, as is obvious from FIG. 2.

Figure 2:
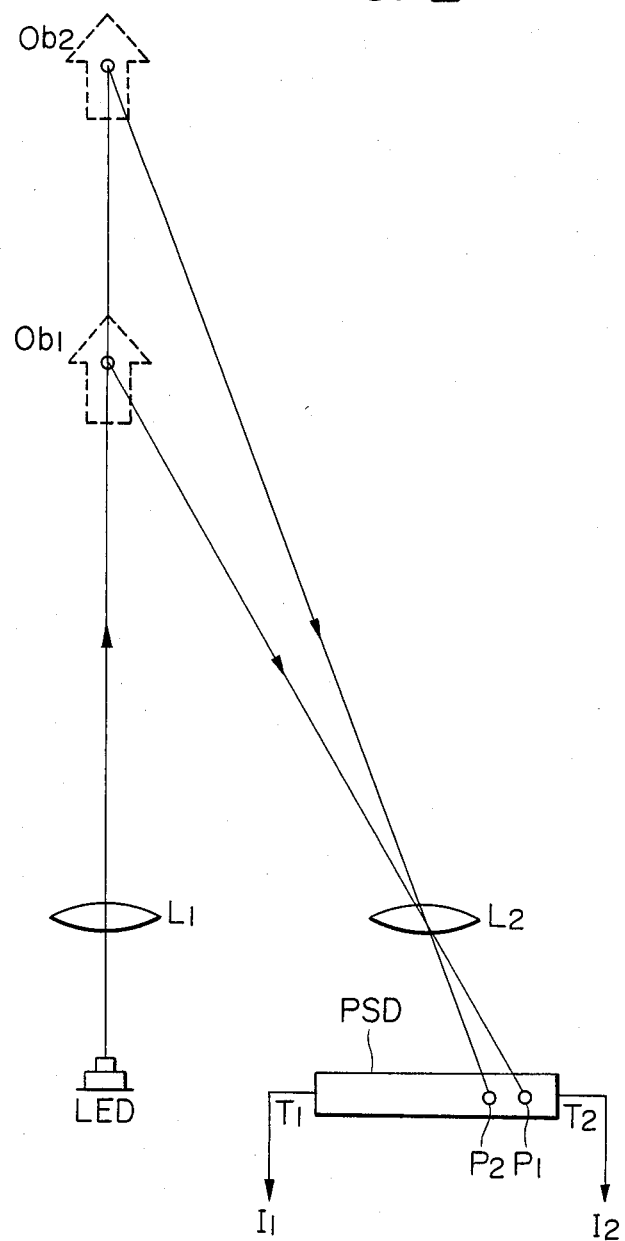
FIG. 2 is a figure showing one of the examples of range finders to be used in the invention.

As shown in FIG. 2, the ray of light source LED is projected onto object Ob through Lens $L_1$, and the reflected light therefrom is projected spotwise onto semiconductor position detecting element PSD through lens $L_2$.

When the object position moves from position $Ob_1$ to $Ob_2$, as shown in the figure, the point of light on the position detecting element PSD moves from point $P_1$ to $P_2$, accordingly.

Examples of the light source LED include a variety of sources such as a lamp, light emitting diode, semiconductive laser, and the like. Pulse-modulated light is emitted from the light source so as to discriminate from natural light. In the case of using a still càmera, it is enough to measure a distance only once. Therefore, it is sufficient to emit a single pulse of light. When a cinematographic camera is used, a series of continuous pulses is emitted.

The semiconductor position detecting element PSD is that disclosed in U.S. patent application Ser. No. 281,890; that is, an element generating an electric current such that the difference between the current $I_1$ and $I_2$ flowing to terminals $T_1$ and $T_2$ respectively, i.e., $[I_1-I_2]$, is proportional to the distance from the midpoint of the element. Accordingly, the distance to object Ob can be measured by differentiating current $I_1$ and/or $I_2$ suitably.

Figure 3:
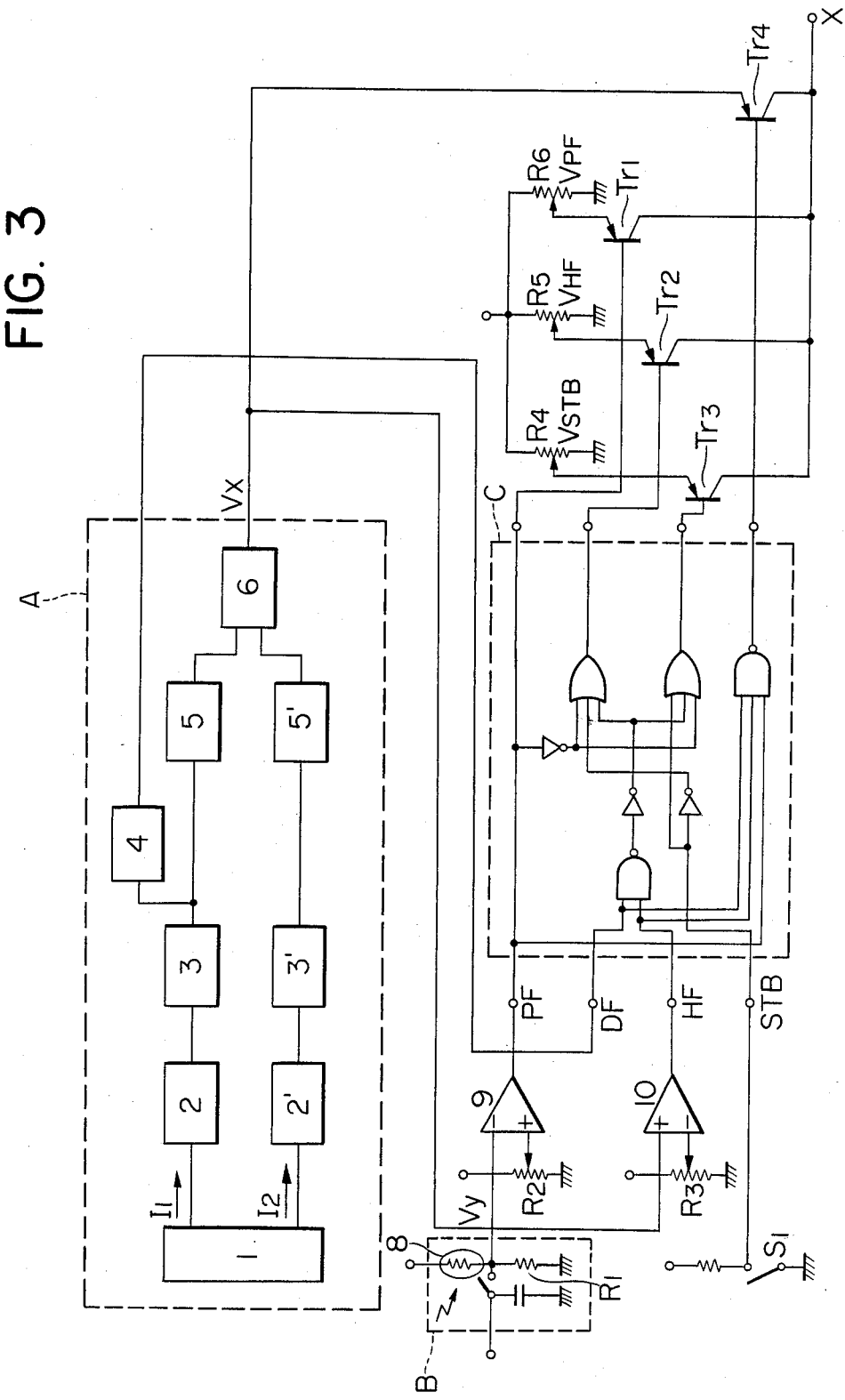
FIG. 3 is a circuit diagram showing one example of the invention.

In FIG. 3, reference numeral 1 designates a semiconductor position detection element PSD which is the same as that shown in FIG. 2. The current from the above-mentioned elements is transformed respectively into the voltages through I/V transformers 2, 2' and the background levels thereof are eliminated through AC amplifiers 3, 3'. At the same time, the signals therefrom are amplified, and logarithmic transformation amplifications are made by logarithmic transformation amplifiers 5, 5'. Numeral 6 designates a differential amplifier. When the output voltage of the AC amplifiers 3, 3' are $V_1$, $V_2$, the output from the differential amplifier 6 would be ln $(V_1/V_2)$.

Figure 4:
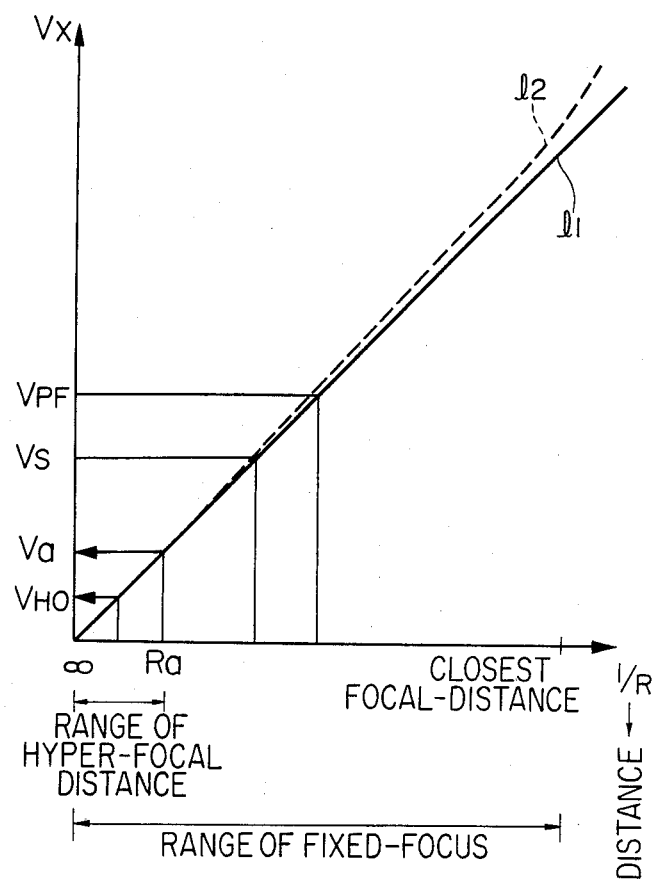
FIG. 4 is a graph illustrating the relation between a distance measured and the output of a range finder device.

When a taking lens is focused at infinity, it would be at the most recessed position and, when it is focused closer, the lens is wholly or partially protruding. The protrusion of a lens is in proportion to the reciprocal of the distance to an object. To be more concrete, solid line $l_1$, shown in FIG. 4, indicates the theoretical protrusion of a lens; that is, an ideal protrusion thereof. Relative to the above, the output of the above-mentioned differential amplifier 6, ln $(V_1/V_2)$ shows the variations indicated by dotted line $l_2$ in FIG. 4. As is obvious from FIG. 4, the output indicated by $l_2$ and the theoretical protrusion of a lens indicated by $l_1$ strongly resemble each other. Therefore, a differential amplifier output can be used for adjusting a lens focal-point since the output remains unchanged or is merely amplified.

Numeral 4 indicates a discrimination circuit for judging whether an AC amplifier output is higher than a prescribed level, and the circuit comprises, as will be described later, a default judging means.

The block bounded by a dotted line A, which is described above, is a distance signal process operation circuit for generating the output of a distance signal Vx. It is not necessary that distance signal Vx be a signal in a 1:1 proportion with distance, as described in the example, but it may be any signal corresponding to an objective distance. A coded digital signal and the like can, of course, be used.

The block bounded by dotted line B is a photometric circuit. Numeral 8 designates a CdS photoreceptor of an automatic exposure control device. Resistor $R_1$ is used to introduce information of shutter speed and film sensitivity. In other words; input terminal ⊖ of comparator 9 receives voltage Vy which represents a diaphragm value for a given object luminance, shutter speed and film sensitivity.

The comparator 9 is a comparing circuit for judging whether the information of a diaphragm value Vy is higher than a value at which fixed focus photography is possible. If the value of Vy is higher, then the comparator circuit will output the value "0"; if it is lower, then 1 is outputted. For example, in the case of using a 35 mm focal length lens in which the closest distance is 0.97 m and the permissible scattering is 0.05 mm, the diaphragm value for giving a fixed focal point is F11.

Numeral 10 is a comparator for judging whether or not a lens is to be set at the hyper-focal point thereof. The output of comparator 10 is "0" and is given to HF when a distance signal Vx has a value at which a hyper-focal photography is possible, while a "1" value is outputted when the "0" value is not outputted. In the example shown in the figure, the hyper-focal point was determined axiomatically so that the focal-point is for the F-value at open aperture. In the example using the above-mentioned lens, the hyper-focal distance was 8.75 m to the open aperture at F 2.8. However, such a hyper-focal point is, variable depending upon the F-value at open aperture. For example, this can easily be realized by introducing diaphragm value information Vy into the ⊖ input of comparator 10.

Reference $S_1$ designates a switch which is to be closed when a flash unit is ready to flash which makes STB "0", while it makes the STB "1" when the flash unit is not ready. Cameras have been known having an electronic flash power circuit which is turned ON by making the electronic flash unit pop-up, and it is possible to use such a switch as the above-mentioned switch $S_1$.

Figure 1:
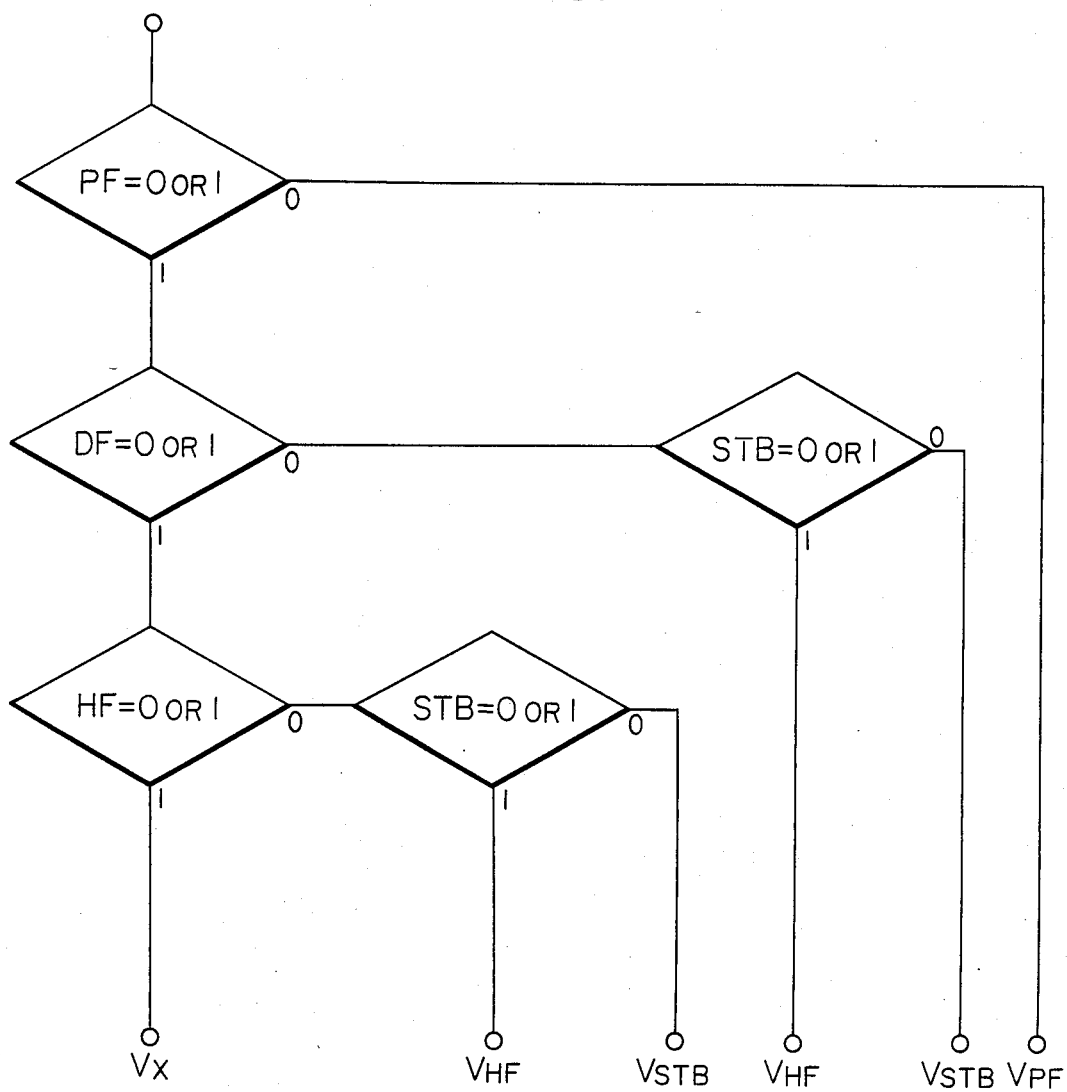
FIG. 1 is a flow-chart schematically illustrating the invention.

The block bounded by dotted line C is the theoretical circuit performing signal processing as shown in FIG. 1 schematically, and detailed in FIG. 5.

Referring to the theoretical circuit functions, PF indicates "0" when the diaphragm is closed down from F11. Consequently, transistor $Tr_1$ is turned ON, and voltage VPF is outputted to terminal x by resistor $R_6$ so as to set a lens to the fixed focal point thereof. The fixed focus mode has priority over any other factors. In FIG. 5, situations 3, 6, 7, 9, 11, 12, 13 and 15 are in a fixed focus mode.

In these instances, satisfactory clear-cut pictures taken from any distance to an object are obtainable when the diaphragm is at F11. Therefore, neither an automatic focusing device or any other lens position setting means need be operated.

When PF is at "1", the output of AC amplifier 3 is then used to judge whether it is sufficient to operate a focusing means. If the output is too faint, discriminating circuit 4 is then operated to make DF "0". When DF is at "0" and when STB is at "0", that is in flash-photography, transistor $Tr_3$ is then turned ON and output VSTB is generated to x by resistor $R_4$. The lens is thereby set at a flash-photography position, for example, at a position where an object three meters away from the lens is in focus.

In the case that DF is at "0" and STB is at "1", transistor $Tr_2$ is then turned ON, and output VHF is generated to x by resistor $R_5$ so as to set the lens at the hyper-focal point.

When discriminating circuit 4 is operated and DF is at "0", the output of distance measuring element 1 is faint. Most of such cases are caused when a distance to an object is far. In these situations, satisfactory clear-cut pictures can usually be obtained if the lens is set at the hyper-focal point. In FIG. 5, numerals 1 and 5 designate such modes.

However, even if an object is measured and in focus, a satisfactory picture cannot be obtained unless exposure is proper. In flash-photography, if the object is distant from the lens an object would be under-exposed. Accordingly, in a flash-photography, much more satisfactory pictures are obtainable when focused on an object within the range wherein proper exposure can be obtained even though an object far from the camera is out of focus. Therefore, the invention is devised so as to output VSTB to x and set a lens at the focal point to an object, say three meters from the lens, when flash-photography is needed, that is, when STB is at "0". In FIG. 5, numerals 10 and 14 designates such modes as mentioned above.

When discriminating circuit 4 does not operate and DF is at "1", the distance to an object is judged whether the distance is far from half of the hyper-focal distance. In other words, with comparator 10, a value of distance measuring signal Vx is judged whether or not the value is higher than a given value. When it is higher than the given value, that is, when HF is at "0", the judgement is made on whether flash-photography is to be carried out. If flash-photography is selected, VSTB is outputted to x and, when it is not the case, VHF is outputted to x.

Lastly, in the case that HF is at "1", transistor $Tr_4$ is turned ON and Vx, a distance measuring signal, is outputted to x. In this way the lens is set at a regular focal point in conformity with the distance measuring signal.

The following is the summary of the operations of the example described above:

(1) Position for fixed focal-point (In the example, the focal point is at the position of the object 2.23 m away from the lens, at F11.)

When a diaphragm is not wider than F11, a lens is set at this position without exception.

(2) Position of flash-photography (In the example, the focal-point is at the position of the object 3.00 m away from the lens.)

In the case that a diaphragm is set wider than F11 and the distance to an object is not closer than one half of the hyper-focal distance of a lens (e.g.; 8.75 m in the example) and a flash unit is also used; or, in the case that the diaphragm is set wider than F11 and the output of a range finder device cannot be used for a distance measuring signal and a flash-unit is also used; then the lens is set at this position.

(3) Position at hyper-focal point (In the example, the focal point is at the position of an object 8.75 m away from the lens.)

The lens is set at the position as in (2) except that no optical equipment is used in this case.

(4) Auto-focus

In the case that a diaphragm is set wider than F11 and a distance measuring signal given from a range finder device indicates a distance to an object closer than one half of the hyper-focal distance of a lens, the lens, is set at the position in conformity with the distance measuring signal given from the range finder device regardless of flash-photography or natural light photography. The above-mentioned are the modes designated by numerals 4 and 16 in FIG. 5.

As for the mechanisms for setting a lens in conformity with the above-mentioned output, i.e.; Vx, VPF, VHF and VSTB, any conventional, publicly known and arbitrary focus adjustment mechanisms can be used. An example of such a mechanism is one in which a servomotor driven lens is stopped in motion at a position corresponding to the voltage of output terminal x by making the output terminal x serve as a terminal for generating a servomotor stopping voltage.

The invention described above refers particularly to the example; however, it is understood that the invention shall not be limited thereto. Modification and variation by persons of ordinary skill is within the scope of the invention as claimed. Among others, modifications which would be apparent include: distance measurement elements such as those comprising a number of photocells among which are a macrometric module manufactured by Honeywell, a CCD, and the like; a micro-computer may be used in place of the hard-logic used in the example; and in the case that the hyper-focal point of a lens is almost the same as the upper limit of a focal point in flash-photography and when DF or HF is at "0", it is not required to judge whether flash-photography is to be made or not, but it is possible to obtain satisfactory pictures by setting a lens at the hyper-focal point thereof.

What is claimed is:

1. A photographic device having a lens and a diaphragm said device capable of automatically focusing said lens comprising
   (a) a lens setting means capable of setting a lens to a particular position;
   (b) a range finding means capable of generating a signal corresponding to a distance from said device to an object to be photographed;
   (c) a primary judging means which determines whether or not a diaphragm setting is within a range in which fixed focus photography is possible; and
   (d) a secondary judging means which determines whether or not said signal from said range finding means is capable of correctly operating said lens setting means to position said lens at a point corresponding to said distance to said object;
   wherein said lens is set to
   (1) a position corresponding to said output signal when said primary judging means determines that said diaphragm setting is not within the range in which fixed focus photography is possible and said secondary judging means determines that said output signal is capable of correctly setting said lens to a position corresponding to said distance from said device to said object,
   (2) the fixed focal distance of said lens when said primary judging means determines said diaphragm setting is within the range in which fixed focus photography is possible,
   (3) the hyper-focal distance of said lens when said primary judging means determines that said diaphragm setting is not within the range in which fixed photography is possible and said secondary judging means determines that said signal from said range finder is not capable of correctly operating said lens setting means to position said lens at a point corresponding to said distance.

2. The device of claim 1 further comprising a flash-photography judging means for determining whether or not flash photography is to be made, said lens being set to
   (4) a flash-photography position when said primary judging means determines fixed focus photography is not possible, said secondary judging means determines said signal from said range finder is not capable of correctly operating said lens setting means to position said lens at a point corresponding to said distance, and said flash-photography judging means determines flash-photography is appropriate.

3. The device of claim 1 further comprising a hyper-focal judging means wherein said lens is set at
   (5) at the hyper-focal distance in said (3) only when said distance to said object is not less than one half of the hyper-focal distance of said lens and flash photography is not being conducted.
   (6) at a flash photography position when the conditions in said (5) prevail except that a flash photography is being conducted, and
   (7) at a position corresponding to said signal from said range finder when said distance to said object is less than one half of the hyper-focal distance of said lens.

4. An automatic focus adjusting device comprising
   (a) a lens setting means capable of setting a lens to a particular position;
   (b) a range finding means capable of generating a signal corresponding to a distance from said device to an object to be photographed;
   (c) a primary judging means which determines whether or not a diaphragm setting is within a range in which fixed focus photography is possible; and
(d) a secondary judging means which determines whether or not said signal from said range finding means is capable of correctly operating said lens setting means to position said lens at a point corresponding to said distance to said object;

wherein said secondary judging means operates only when said primary judging means determines that said diaphragm setting is not within said range in which fixed focus photography is possible and said lens setting means is operated only when said secondary judging means determines the output signal is at a level capable of correctly operating said lens setting means.

5. The device of claim 4 wherein said lens is set at the fixed focal position when said primary judging means determines that said diaphragm setting is within said range in which fixed focus photography is possible.

6. The device of claim 4 wherein said secondary judging means comprises a default judging means for determining whether or not said output signal from said range finding means can be used as a signal for operating said lens setting means.

7. The device of claim 4 wherein said lens is set to the hyper-focal position when said secondary judging means determines said output signal is not at a level capable of correctly operating said lens setting means to position said lens at a point corresponding to said distance.

8. The device of claim 4 further comprising a flash-photography judging means for determining whether or not flash-photography is to be made when said secondary judging means determines that said output signal is not at a level capable of correctly operating said lens setting means to set said lens at a position corresponding to said distance, said lens being set to a position for taking flash-photography when said flash-photography judging means determines flash-photography is appropriate and set to the hyper-focal position when said flash-photography judging means determines flash-photography is not appropriate.

9. The device of claim 5 wherein said secondary judging means comprises a default judging means for determining whether or not said output signal from said range finding means can be used as a signal for correctly operating said lens setting means to set said lens at a position corresponding to said distance.

10. The device of claim 5 further comprising a flash-photography judging means for determining whether or not flash-photography is to be made when said secondary judging means determines said output signal is not at said level capable of correctly operating said lens setting means to position said lens at a point corresponding to said distance, said lens being set at a position for taking flash-photography when said flash-photography judging means determines flash-photography is appropriate and said lens being set at the hyper-focal position when said flash-photography means determines flash-photography is not appropriate.

11. The device of claim 9 further comprising a hyper-focal judging means for determining whether or not hyper-focal photography is to be made, said lens being set at said hyper-focal position when said hyper-focal judging means determines hyper-focal photography is appropriate and said lens being set at a position corresponding to said output signal when said hyper-focal judging means determines hyper-focal photography is inappropriate, provided that said hyper-focal judging means determination is considered only when said primary judging means determines said diaphragm setting is not within a range for fixed focus photography and said secondary judging means determination is that said output signal from said range finding means is not at a level capable of correctly operating said lens setting means so as to position said lens at a point corresponding to said distance.

12. The device of claim 12 further comprising a flash-photography judging means to determine whether or not flash-photography is to be made, said lens being set at a position for taking flash-photography when said flash-photography judging means determines flash-photography is appropriate and said lens being set at the hyper-focal position when said flash-photography judging means determines flash-photography is not appropriate.

13. An automatic focus adjusting method comprising
(a) a first step of judging whether or not a diaphragm setting is within a range in which fixed focus photography is possible;
(b) a second step of judging whether or not an output of a range finding means is at a level capable of operating a lens setting means to position a lens at a point corresponding to a distance between said range finding means and an object;
(c) a third step of operating said lens setting means; and
(d) a fourth step of setting said lens to a point corresponding to said output of said range finding means;

wherein said fourth step is performed only when said diaphragm setting is deemed, in said first step, not within the range in which fixed focus photography is possible and only when said output of said range finding means is deemed capable of correctly operating said lens setting means to set said lens at a position corresponding to a distance between said range finder and said object.

* * * * *